(12) United States Patent
Kim et al.

(10) Patent No.: US 8,043,389 B2
(45) Date of Patent: Oct. 25, 2011

(54) FUEL CELL HEAT RECOVERING REFORMER AND SYSTEM

(75) Inventors: Ju-Yong Kim, Suwon-si (KR); Ji-Seong Han, Suwon-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 1331 days.

(21) Appl. No.: 11/067,841

(22) Filed: Feb. 26, 2005

(65) Prior Publication Data

US 2005/0191534 A1    Sep. 1, 2005

(30) Foreign Application Priority Data

Feb. 26, 2004 (KR) .................. 10-2004-0012967

(51) Int. Cl.
 *H01M 8/06*    (2006.01)
(52) U.S. Cl. ................. 48/61; 429/423; 422/601
(58) Field of Classification Search ............ 48/61–118.5
 See application file for complete search history.

(56) References Cited

U.S. PATENT DOCUMENTS

| | | | | |
|---|---|---|---|---|
| 4,810,472 | A | * | 3/1989 | Andrew et al. ............. 422/197 |
| 5,540,190 | A | * | 7/1996 | Rogers et al. ............... 123/1 A |
| 5,769,909 | A | | 6/1998 | Bonk et al. |
| 2003/0054215 | A1 | * | 3/2003 | Doshi et al. ...................... 429/26 |
| 2004/0244290 | A1 | * | 12/2004 | Yamamoto et al. .......... 48/127.9 |

FOREIGN PATENT DOCUMENTS

| | | |
|---|---|---|
| JP | 04-321897 | 11/1992 |
| JP | 10-194356 | 7/1998 |
| JP | 2000-154001 | 6/2000 |
| JP | 2001-089104 | 4/2001 |
| JP | 2001-261304 | 9/2001 |
| JP | 2002-003202 | 1/2002 |
| JP | 2002-056873 | 2/2002 |
| JP | 2002-226202 | 8/2002 |
| JP | 2003-089504 | 3/2003 |
| JP | 2003-312743 | 11/2003 |
| JP | 2004-216105 | 8/2004 |

OTHER PUBLICATIONS

Translation of JP 2001-089104.*
Patent Abstracts of Japan, Publication No. 2001-261304, dated Sep. 26, 2001, in the name of Yuichi Nagao et al.
Patent Abstracts of Japan, Publication No. 2003-089504, dated Mar. 28, 2003, in the name of Naohiko Matsuda et al.
Japanese Office action dated Nov. 4, 2009, for corresponding Japanese application 2005-054773, noting listed references in this IDS, as well as other Japanese references previously filed in an IDS dated Jan. 29, 2009.

* cited by examiner

*Primary Examiner* — Alexa Neckel
*Assistant Examiner* — Imran Akram
(74) *Attorney, Agent, or Firm* — Christie, Parker & Hale, LLP

(57) ABSTRACT

A fuel cell system includes a reformer for reforming fuel and generating hydrogen gas. A stack generates electricity through an electrochemical reaction between the hydrogen gas and oxygen. A fuel supply unit supplies fuel to the reformer. An air supply unit supplies air to the reformer and the stack. The reformer includes a reformation reactor unit for generating the hydrogen gas and a heat-insulating unit including a vacuum area covering the reformation reactor unit and recovering heat generated from the reformation unit.

12 Claims, 5 Drawing Sheets

100

FUEL CELL HEAT RECOVERING REFORMER AND SYSTEM

CROSS REFERENCE TO RELATED APPLICATION

This application claims priority to and the benefit of Korean Patent Application No. 10-2004-0012967 filed on Feb. 26, 2004 in the Korean Intellectual Property Office, the entire content of which is incorporated herein by reference.

FIELD OF THE INVENTION

The present invention relates to a fuel cell system, and more particularly, to the structure of a reformer of the fuel cell system.

BACKGROUND OF THE INVENTION

A fuel cell is generally known as an electricity generating system which directly converts chemical energy into electric energy through an electrochemical reaction between oxygen, or air containing the oxygen, and hydrogen contained in hydrocarbon-grouped materials such as methanol and natural gas. Specifically, the fuel cell has a feature that it can produce electricity through the electrochemical reaction between hydrogen and oxygen without combustion and provides heat as a byproduct thereof that can be used simultaneously.

Fuel cells are classified into a phosphate fuel cell working at a temperature of about 150° C. to 200° C., a molten carbonate fuel cell working at a high temperature of about 600° C. to 700° C., a solid oxide fuel cell working at a high temperature of 1,000° C. or more, and a polymer electrolyte membrane fuel cell (PEMFC) and an alkali fuel cell working at room temperature or a temperature of 100° C. or less, depending upon the kind of electrolyte used. These fuel cells work basically on the same principle, but are different from one another in kind of fuel, operating temperature, catalyst, and electrolyte.

The recently developed polymer electrolyte membrane fuel cell (PEMFC) has an excellent output characteristic, a low operating temperature, and a fast starting and response characteristic as compared with other fuel cells, and uses hydrogen obtained by reforming methanol, ethanol, natural gas, etc. Accordingly, the PEMFC has a wide range of applications such as a mobile power source for vehicles, a distributed power source for the home or buildings, and a small-sized power source for electronic devices.

The aforementioned PEMFC has a fuel cell main body (hereinafter, referred to as a stack), a fuel tank, and a fuel pump supplying fuel to the stack from the fuel tank, to constitute a typical system. Such a fuel cell further includes a reformer for reforming the fuel to generate hydrogen gas and supplying the hydrogen gas to the stack. Therefore, in the PEMFC the fuel is stored in the fuel tank is supplied to the reformer by means of pumping power of the fuel pump. The reformer then reforms the fuel and generates the hydrogen gas. The stack makes the hydrogen gas and oxygen electrochemically react with each other, thereby generating electric energy.

Alternatively, such a fuel cell can employ a direct methanol fuel cell (DMFC) scheme directly supplying liquid fuel containing hydrogen to the stack and generating electricity. The fuel cell employing the direct methanol fuel cell scheme does not require the reformer, unlike the PEMFC.

In the fuel cell system described above, the stack substantially generating the electricity has a stacked structure of several or several tens of unit cells having a membrane-electrode assembly (MEA) and a separator (or a bipolar plate). The MEA has a structure such that an anode electrode and a cathode electrode are bonded to each other with an electrolyte membrane therebetween. The separator simultaneously performs a function of a passage through which oxygen and hydrogen gas required for the reaction of the fuel cell are supplied, and a function of a conductor connecting the anode electrode and the cathode electrode of each MEA to each other in series.

Therefore, through the separator, hydrogen gas is supplied to the anode electrode and oxygen is supplied to the cathode electrode. An oxidation reaction of the hydrogen gas takes place in the anode electrode and a reduction reaction of oxygen takes place in the cathode electrode. Due to movement of electrons generated at that time, electricity, heat, and water can be collectively obtained.

The reformer described above is an apparatus which converts through a catalytic reformation reaction the liquid fuel containing hydrogen and water into the hydrogen gas required for generation of electricity by the stack, and, in addition, which removes noxious substances such as carbon monoxide which poisons the fuel cell and shortens its lifetime. The reformer includes a reforming section for reforming the fuel and generating the hydrogen gas, and a carbon-monoxide removing section for removing carbon monoxide from the hydrogen gas. The reforming section converts the fuel into reformed gas that is rich in hydrogen through a catalytic reaction such as steam reformation, partial oxidation, natural reaction, etc. The carbon-monoxide removing section removes carbon monoxide from the reformed gas using a catalytic reaction such as a water-gas shift reaction, an oxidation reaction, etc., or hydrogen purification with a separating membrane.

In the conventional reformer of a fuel cell system, the reforming section includes an exothermic reaction portion inducing a catalytic oxidation reaction between fuel and air and generating combustion heat, and an endothermic reaction portion accepting the combustion heat, inducing a catalytic reformation reaction of the fuel, and generating the hydrogen gas. Therefore, in the reforming section, the endothermic reaction portion accepts a predetermined reaction heat from the exothermic reaction portion and generates the reformed gas having rich in hydrogen from a mixed fuel of liquid fuel and water through the catalytic reformation reaction.

However, since the conventional reformer of a fuel cell system has a structure such that the reaction heat can easily leak outside, the reforming section, which needs a uniform temperature distribution, exhibits an uneven temperature distribution, such that reaction efficiency and thermal efficiency of the overall reformer deteriorates.

SUMMARY OF THE INVENTION

In accordance with the present invention a reformer of a fuel cell system capable of effectively recovering reaction heat for forming reformed gas, and a fuel cell system employing the reformer, is provided.

According to an aspect of the present invention, a reformer of a fuel cell system includes: a reformation reactor unit for reforming fuel and generating hydrogen gas, and a heat-insulating unit having a vacuum area covering the reformation reactor unit and recovering heat generated from the reformer reactor.

The heat-insulating unit may include an inner wall surrounding the reformation reactor unit, and an outer wall which is disposed with a gap from the inner wall to form the vacuum area.

The reformation reactor unit may include a first reactor for combusting liquid fuel and air through a catalytic oxidation reaction and generating heat, and a second reactor for absorbing the heat generated from the first reacting section, vaporizing mixed fuel of the liquid fuel and water, and generating reformed gas from the vaporized fuel through a catalytic reformation reaction.

The inner wall and the outer wall may be made of at least one material selected from stainless steel, ceramics, aluminum, and zirconium.

The reformer may further include at least one carbon-monoxide reducing section which is connected to the reformation reactor unit and reduces the concentration of carbon monoxide from the reformed gas generated from the reformation reactor unit.

A heat-insulating member may be disposed in the vacuum area, and the heat-insulating member may be made of glass fiber or porous ceramics.

At least one spacer for maintaining a gap may be disposed between the inner wall and the outer wall, and the spacer may be formed as a connection member provided to penetrate the inner wall and the outer wall.

According to another aspect of the present invention, there is also provided a fuel cell system including: a reformer for reforming fuel and generating hydrogen gas; a stack for generating electricity through an electrochemical reaction between the hydrogen gas and oxygen; a fuel supply unit for supplying the fuel to the reformer; and an air supply unit for supplying air to the reformer and the stack, wherein the reformer includes a reformation reactor unit for generating the hydrogen gas and a heat-insulating unit having a vacuum area covering the reformation reactor unit and recovering heat generated from the reformation reactor unit.

The fuel supply unit may include: a first tank for storing liquid fuel; a second tank for storing water; and a fuel pump connected to the first tank and the second tank.

The air supply unit may include an air pump for drawing in external air.

The fuel cell system may employ a PEMFC scheme.

DETAILED DESCRIPTION

An exemplary embodiment of a fuel cell system according to the present invention employs a PEMFC in which a reformed gas that is rich in hydrogen is generated by reforming fuel containing hydrogen and the chemical energy generated by allowing the reformed gas and oxygen to electrochemically react with each other is directly converted into electric energy.

Figure 1:
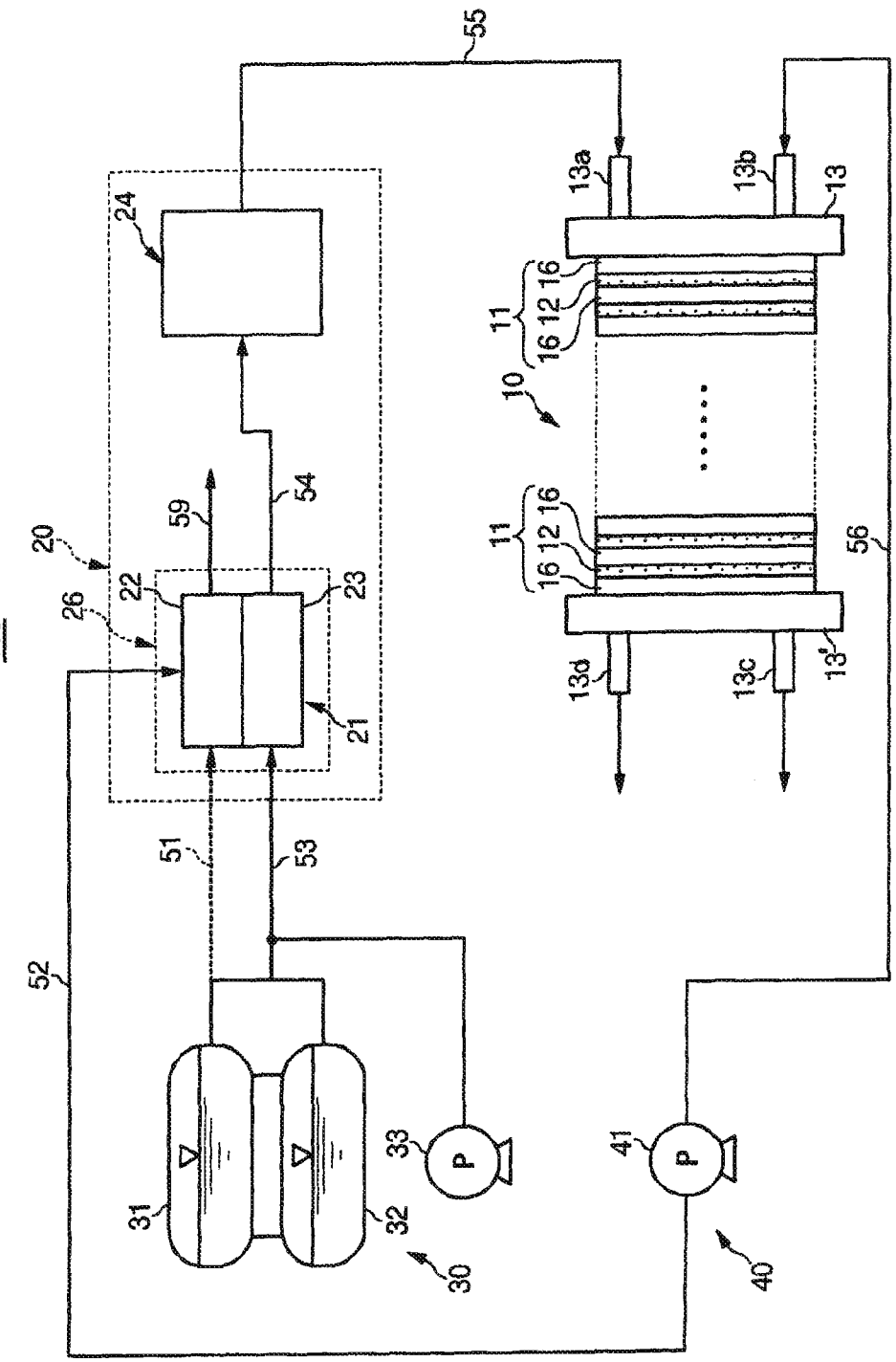
FIG. 1 is a block diagram illustrating the overall structure of a fuel cell system according to an embodiment of the present invention.

Referring now to FIG. 1, fuel cell system 100 according to an embodiment of the present invention includes a reformer 20 which reforms fuel containing hydrogen to generate reformed gas that is rich in hydrogen. Stack 10 converts the chemical reaction energy between the reformed gas generated from the reformer 20 and oxygen into electric energy to generate electricity. Fuel supply unit 30 supplies the fuel to the reformer 20. Air supply unit 40 supplies external air to the stack 10 and the reformer 20.

In the fuel cell system 100 the principal fuel for generating electricity is water plus a hydrocarbon-grouped or an alcohol-grouped hydrogen fuel such as methanol, ethanol, natural gas, etc. For convenience, the combination of liquid fuel and water is defined as mixed fuel.

The fuel cell system 100 can generate electricity through an electrochemical reaction between the reformed gas and oxygen in the external air supplied from the air supply unit 40.

Alternatively, the fuel cell system 100 may supply oxygen gas from storage tanks or cylinders and the reformed gas generated from the reformer 20 to the stack 10 and may generate electric energy through an electrochemical reaction therebetween.

In the description below, the exemplary embodiments will be explained using external air for the needed oxygen.

The fuel supply unit 30 includes a first tank 31 for storing liquid fuel containing hydrogen, that is, hydrocarbon-grouped or alcohol-grouped hydrogen fuel such as methanol, ethanol, natural gas, etc. Second tank 32 stores water. Fuel pump 33 is connected to the first tank 31 and the second tank 32, respectively. The air supply unit 40 includes an air pump 41 for drawing the external air.

Figure 2:
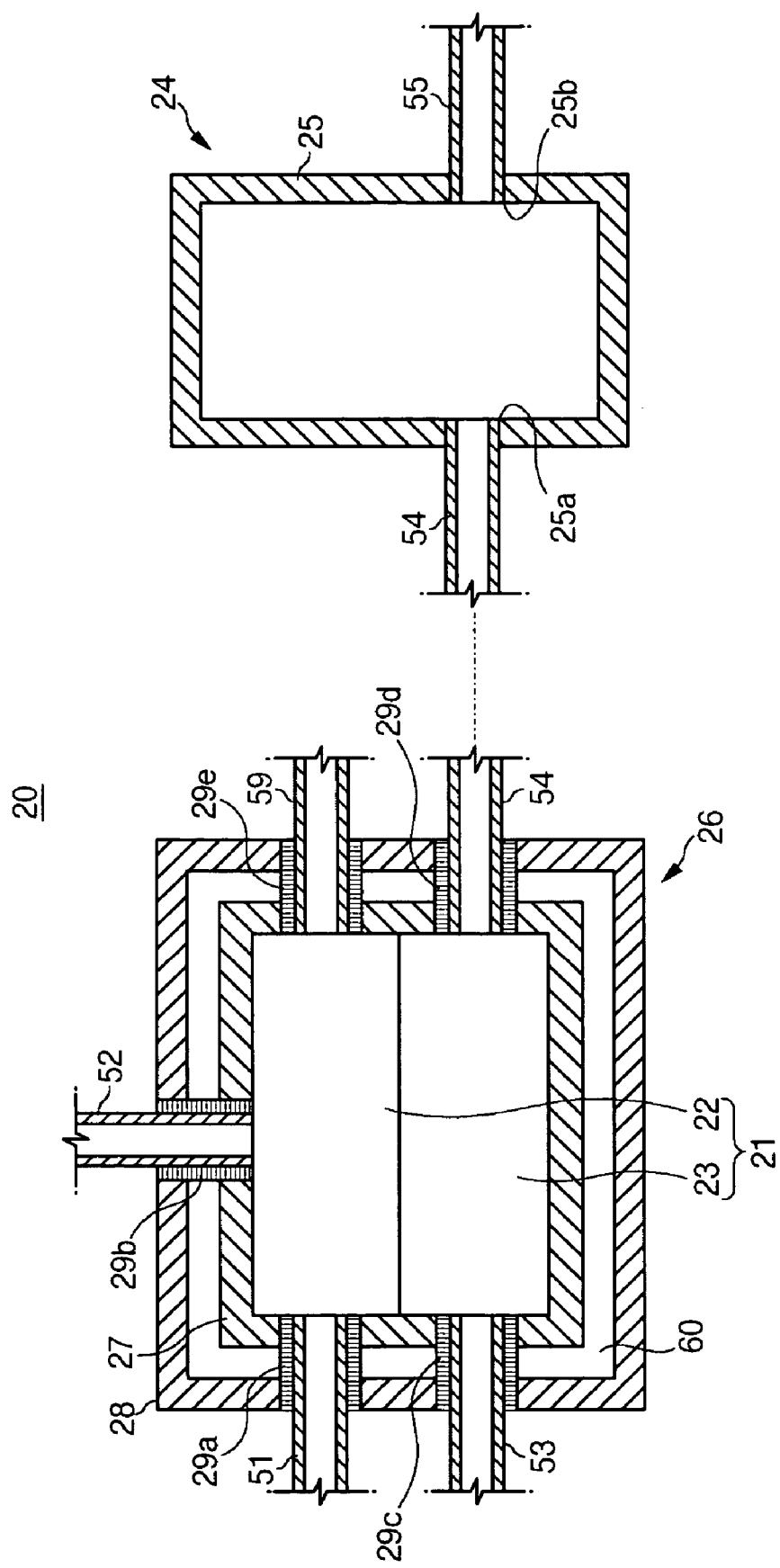
FIG. 2 is a cross-sectional view illustrating the structure of a reformer shown in FIG. 1.

FIG. 2 is a cross-sectional view illustrating a structure of the reformer shown in FIG. 1. Referring to FIGS. 1 and 2, the reformer 20 used in the fuel cell system 100 includes a reformation reactor unit 21 for generating the reformed gas rich in hydrogen from the mixed fuel through a predetermined catalytic reaction.

The reformation reactor unit 21 includes a first reactor 22 which combusts the liquid fuel with air to generate reaction heat having a predetermined temperature, and a second reactor 23 which, using the reaction heat, generates the reformed gas rich in hydrogen gas.

The first reactor 22 is an exothermic section for supplying heat required for generating the reformed gas, and combusts the liquid fuel and the external air through a catalytic oxidation reaction.

The first reactor 22 may be formed in a plate shape constituting a flow channel (not shown) enabling the fuel and the air to flow. A general catalytic oxidation layer (not shown) for promoting the catalytic oxidation reaction between the fuel and the air is formed in the flow channel. The first reactor 22 and the first tank 31 of the fuel supply unit 30 can be connected to each other through a first supply line 51. The first reactor 22 and the air supply unit 40 can be connected to each other through a second supply line 52. Discharge line 59 connected to the first reactor 22 discharges to the outside of the reformer 20 the combustion gas generated from the catalytic oxidation reaction and the remaining fuel and air not participating in the reaction.

The second reactor 23 absorbs the reaction heat generated from the first reactor 22 and evaporates the mixed fuel. The second reactor 23 generates the reformed gas rich in hydrogen from the evaporated fuel through a steam reformation (SR) catalytic reaction. The second reactor 23 may be formed in a plate shape constituting a flow channel (not shown) enabling the mixed fuel required for the catalytic reformation reaction to flow, and may be provided close to the first reactor 22. A general catalytic layer (not shown) for promoting the catalytic reformation reaction of the mixed fuel is formed in the flow channel. The second reactor 23 can be connected to the first and second tanks 31 and 32 of the fuel supply unit 30 through a third supply line 53.

According to the present invention, the first and second reactors 22, 23 are not limited to a plate shape having the flow channel and disposed close to each other, but may be formed in a cylindrical reaction vessel shape. That is, the first reactor 22 and the second reactor 23 may be constructed such that: the first reactor 22 has a structure wherein a catalytic oxidation layer is formed is inside a reaction vessel, the second reactor 23 has a structure wherein a catalytic reformation layer is formed inside a reaction vessel, and the reaction vessel of the second reactor 23 is located at the inside of the reaction vessel of the first reactor 22.

Further, in the reformer 20 according to an exemplary embodiment, at least one carbon-monoxide reducing section 24 for reducing the concentration of carbon monoxide from the reformed gas through a water-gas shift (WGS) catalytic reaction or a preferential CO oxidation (PROX) catalytic reaction may be disposed between the stack 10 and the reformation reactor unit 21.

The carbon-monoxide reducing section 24 includes: a cylindrical reaction vessel 25 connected to the reformation reactor unit 21, a typical water-gas shift catalyst layer (not shown), or a preferential CO oxidation catalyst layer (not shown) formed at the inside of the reaction vessel 25.

The reaction vessel 25 has an inlet 25a allowing the reformed gas supplied from the reformation reactor unit 21 to flow in the inner space of the reaction vessel 25 and an outlet 25b allowing the reformed gas to be supplied to the stack, the reformed gas having the concentration of carbon monoxide reduced through a catalytic reaction caused by the catalytic layer in the inner space. The inlet 25a of the reaction vessel 25 can be connected to the second reactor 23 through a fourth supply line 54. The outlet 25b of the reaction vessel 25 can be connected to the stack 10 through a fifth supply line 55.

Figure 3:
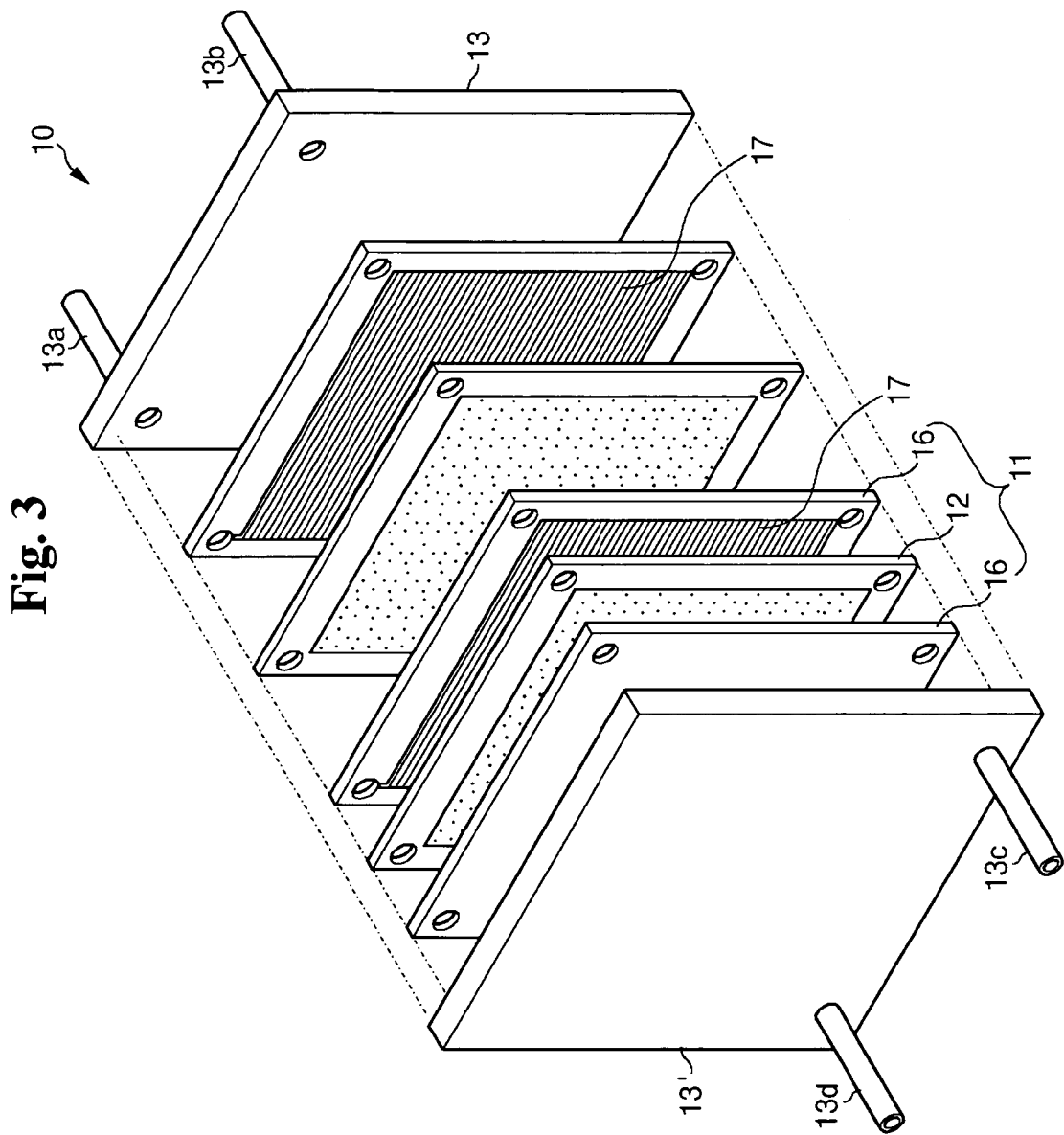
FIG. 3 is an exploded perspective view illustrating the structure of a stack shown in FIG. 1.

Referring now to FIGS. 1 and 3, the stack 10 used in the fuel cell system 100 includes multiple electricity generators 11 which, to generate electric energy, induce an oxidation/reduction reaction between the reformed gas reformed by the reformer 20 and the air.

Each electricity generator 11 constitutes a unit cell for generating electricity, and includes an MEA 12 for oxidizing/reducing the reformed gas and oxygen in the air and separators 16 for supplying the reformed gas and the air to the MEA 12.

In each electricity generator 11, the separators 16 are disposed on both surfaces of the MEA 12. The stack 10 is formed by continuously stacking electricity generators 11. Input end plate 13 and output endplate 13' are disposed at the outermost sides of the stack 10.

In the MEA 12, a conventional MEA structure is employed, in which an electrolyte membrane is interposed between an anode electrode and a cathode electrode constituting respective side surfaces thereof. The anode electrode is supplied with the reformed gas through the separator 16, and includes a catalyst layer for converting the reformed gas into electrons and hydrogen ions through an oxidation reaction and a gas diffusion layer (GDL) for smoothly moving the electrons and the hydrogen ions. The cathode electrode is supplied with the air through the separator 16, and includes a catalyst layer converting oxygen in the air into electrons and oxygen ions through a reduction reaction and a gas diffusion layer smoothly moving the electrons and the oxygen ions. The electrolyte membrane is made of a solid polymer electrolyte with a thickness of 50 to 200 μm, and has an ion exchanging function of moving the hydrogen ions generated from the catalyst layer of the anode electrode to the catalyst layer of the cathode electrode.

The separators 16 are disposed at both sides of the MEA 12 and are in close contact with the anode electrode and the cathode electrode of the MEA 12. A flow channel 17 for supplying the reformed gas to the anode electrode and supplying the air to the cathode electrode is formed in the surfaces of the separators 16 coming in close contact with the anode electrode and the cathode electrode of the MEA 12.

The respective end plates 13, 13' are disposed at the outermost sides of the stack 10 and have a function of closely compressing the plural electricity generators 11. End plate 13 includes a first supply pipe 13a for injecting the reformed gas formed from the reformer 20 into the flow channels 17 and a second supply pipe 13b for injecting the air into the flow channels 17. End plate 13' includes a first discharge pipe 13c for discharging the hydrogen gas not participating in the reaction and finally remaining in the plural electricity generators 11, and a second discharge pipe 13d for discharging the air not participating in the reaction and finally remaining in the plural electricity generators 11. Here, the carbon-monoxide reducing section 24 can be connected to the first supply pipe 13a through the aforementioned fifth supply line 55. The air supply unit 40 can be connected to the second supply line 13b through a sixth supply line 56.

When the fuel cell system 100 having the aforementioned structure operates, a part of the reaction heat generated from the first reactor 22 of the reformation reactor unit 21 may not be delivered to the second reactor 23 and may leak outside, so that unevenness in temperature can occur in the second reactor 23 and thus reaction efficiency or thermal efficiency deteriorates.

However, according to an exemplary embodiment of the present invention, the reformer includes a heat-insulating unit 26 for recovering heat so that it does not externally leak from the reformation reactor unit 21.

Referring to FIG. 2, the heat-insulating unit 26 according to the exemplary embodiment includes an inner wall 27 surrounding the whole reformation reactor unit 21, and an outer wall 28 which is disposed with a predetermined gap from the inner wall 27 and surrounds the inner wall 27. As a result, a space is formed between the inner wall 27 and the outer wall 28, the space constituting a vacuum area 60 implemented through a conventional vacuum process. The vacuum area 60 covers the reformation reactor unit 21.

The inner wall 27 and the outer wall 28 may be made of at least one material selected from stainless steel such as Steel Use Stainless (SUS), heat-insulating metal such as aluminum and zirconium, and heat-insulating non-metal. The inner wall 27 and the outer wall 28 may be made of the same material or may be made of different materials. The inner wall 27 and the outer wall 28 may have the same thickness or may have different thicknesses.

The heat-insulating unit 26 includes first and second connection members 29a, 29b penetrating the outer wall 28 and the inner wall 27 and connecting the first and second supply lines 51, 52 to the first reactor 22, and third and fourth connection members 29c, 29d penetrating the outer wall 28 and the inner wall 27 and connecting the third and fourth supply lines 53, 54 to the second reactor 23.

A fifth connection member 29e, penetrating the outer wall 28 and the inner wall 27 and connecting the discharge line 59 to the first reactor 22, is formed in the heat-insulating unit 26.

The first, second, third, fourth, and fifth connection members 29a, 29b, 29c, 29d, 29e serve as spacers for penetrating the inner wall 27 and the outer wall 28 and maintaining the gap therebetween, as well as serving as connecting means for connecting the supply lines and the discharge line to the reformation reactor unit. The spacers are not limited to the above structure of the connection members, but may have a structure of a bead or rib shape or a protrusion shape supported by both the inner wall 27 and the outer wall 28.

The operation of the fuel cell system according to the exemplary embodiments of the present invention having the aforementioned structures will be described in more detail.

First, the fuel pump 33 supplies the liquid fuel stored in the first tank 31 to the first reactor 22 through the first supply line 51. The air pump 41 supplies the external air to the first reactor 22 through the second supply line 52. Then, the first reactor 22 generates predetermined reaction heat through the catalytic oxidation reaction between the liquid fuel and the air. At this time, the first reactor 22 discharges the combustion gas and the remaining fuel and air having not participated in the reaction, to the outside of the reformer 20 through the discharge line 59.

Also, the fuel pump 33 supplies the liquid fuel and the water stored in the first tank 31 and the second tank 32, respectively, to the second reactor 23 through the third supply line 53. The second reactor 23 is supplied with the reaction heat generated from the first reactor and maintains a preheated state at a predetermined temperature.

Then, in the second reactor 23, a reaction of decomposing the mixed fuel (of the liquid fuel and the water) and a reaction of shifting carbon monoxide simultaneously take place through the steam reformation (SR) catalytic reaction, thereby generating the reformed gas containing carbon dioxide and hydrogen. At this time, the second reactor 23 cannot completely perform the carbon-monoxide shift reaction, thereby generating the reformed gas containing a minute amount of carbon monoxide as a byproduct.

In the course of undergoing the above processes, since the reaction heat generated from the reformation reactor unit 21 can be recovered by the inner wall 27 and the outer wall 28 as well as the vacuum area 60 covering the reformation reactor unit 21, the reformer 20 can prevent loss of the reaction heat generated from the reformation reactor unit 21, so that it is possible to enhance the reaction efficiency and the thermal efficiency of the reformation reactor unit 21.

Figure 4:
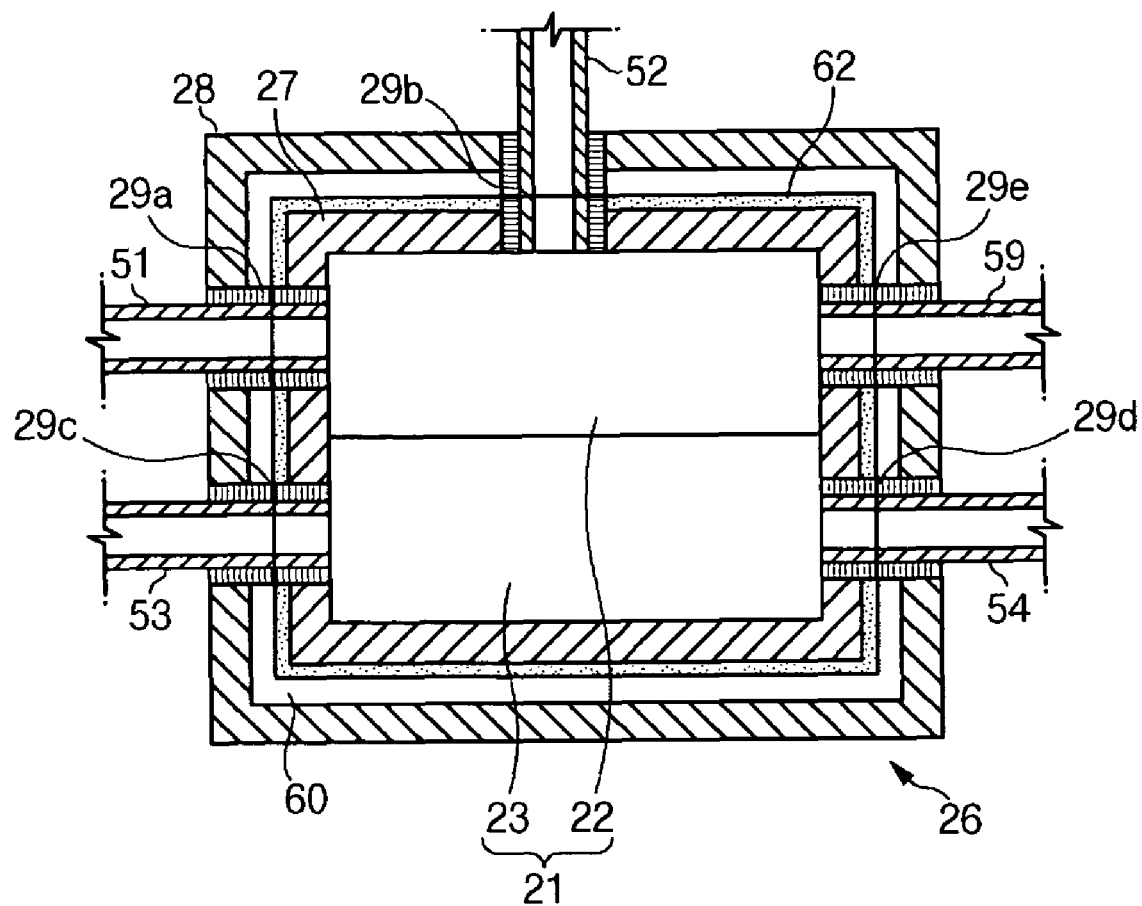
FIGS. 4 and 5 are cross-sectional views illustrating further embodiments of the present invention.
Figure 5:
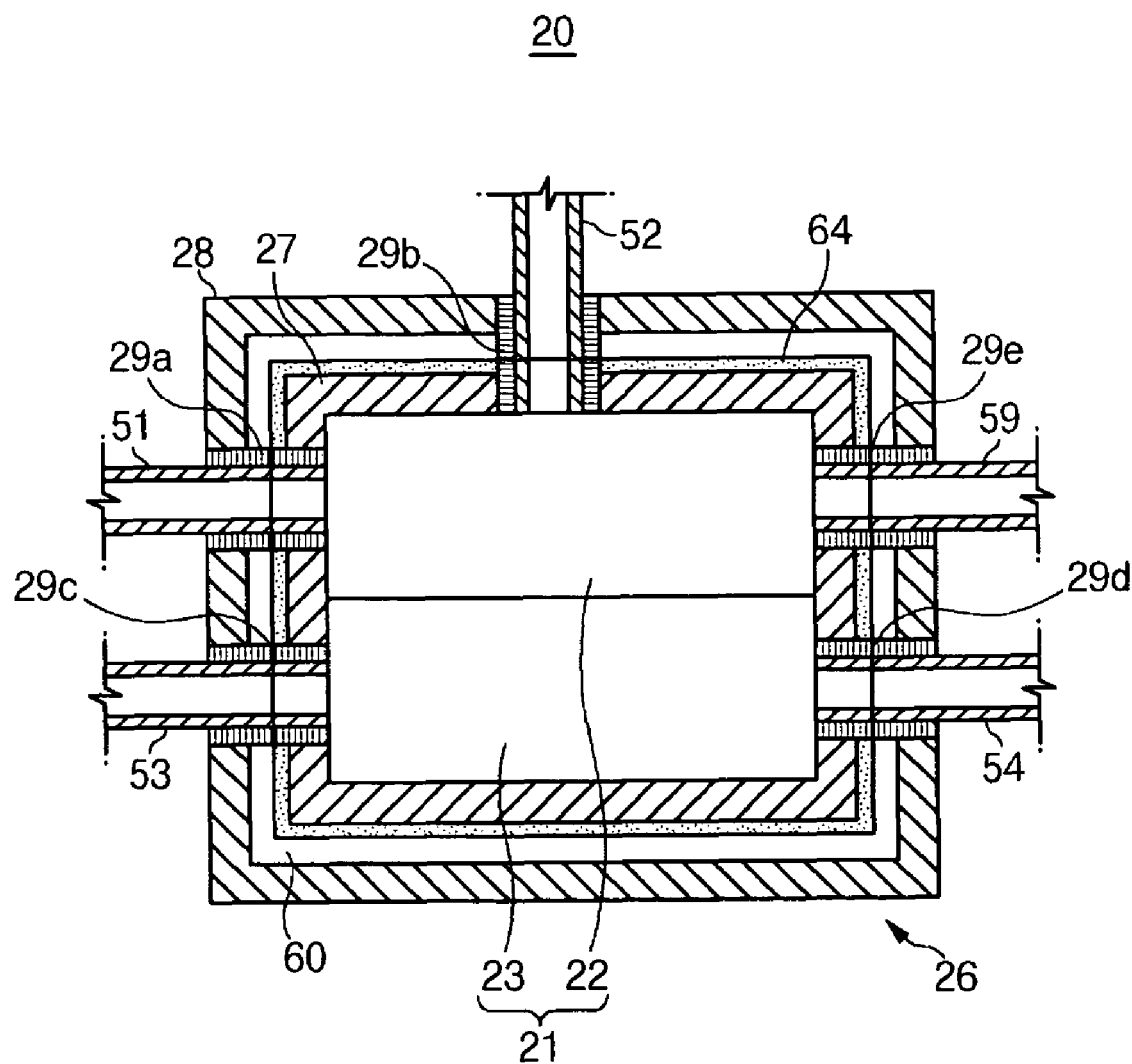

In order to further enhance the heat-insulating effect, a heat-insulating member may be provided in the vacuum area 60. The heat-insulating member may be made of glass fiber 62 or porous ceramics 64 provided to surround the inner wall 27, as shown in FIGS. 4 and 5.

Further, in order to enhance the heat-insulating effect, the inner surface of the outer wall 28 may be coated with a reflective layer or the inner surface may be formed to be rough, so as to reflect the reaction heat generated from the reformation reactor unit 21.

The reformed gas is supplied to the reaction vessel 25 of the carbon-monoxide reducing unit 24 through the fourth supply line 54. At this time, the reformed gas can be supplied to the reaction vessel 25 by means of the pumping power of the fuel pump 33. The reaction vessel 25 then reduces the concentration of carbon monoxide from the reformed gas through the water-gas shift (WGS) catalytic reaction or the preferential OC oxidation (PROX) catalytic reaction.

Subsequently, the reformed gas is supplied to the first supply pipe 13a of the stack 10 through the fifth supply line 55. At this time, the reformed gas may be supplied to the first supply pipe 13a of the stack 10 by means of the pumping power of the fuel pump 33.

Simultaneously, the air pump 41 supplies the external air to the second supply pipe 13b of the stack 10 through the sixth supply line 56.

Therefore, when supplied with the reformed gas through the first supply pipe 13a of the stack 10 and supplied with the external air through the second supply pipe 13b, the stack 10 generates electricity, heat, and water in accordance with the following reactions:

$H_2 \rightarrow 2H^+ + 2e^-$  Anode reaction $\frac{1}{2}O_2 + 2H^+ + 2e^- \rightarrow H_2O$  Cathode reaction $H_2 + \frac{1}{2}O_2 \rightarrow H_2O + \text{current} + \text{heat}$  Total reaction Referring to the above reactions, the reformed gas is supplied to the anode electrode of the MEA 12 through the separator 16, and the air is supplied to the cathode electrode. When the reformed gas flows through the anode electrode, hydrogen is decomposed into electrons and protons (hydrogen ions) in the catalytic layer. When the protons pass through the electrolyte membrane, electrons, oxygen ions, and protons are synthesized to generate water with the help of a catalyst. The electrons generated from the anode electrode do not pass through the electrolyte membrane but are moved to the cathode electrode through an external circuit. Through these processes, electricity, water, and heat are generated.

In the fuel cell system according to the present invention, since the structure capable of recovering the reaction heat generated from the reformation reactor unit is provided, it is possible to enhance the reaction efficiency and the thermal efficiency of the reformer. Therefore, it is possible to further enhance performance and efficiency of the overall system.

Although the exemplary embodiments of the present invention have been described, the present invention is not limited to the above exemplary embodiments, but may be modified in various forms without departing from the scope of the appended claims, the detailed description, and the accompanying drawings of the present invention. Therefore, those skilled in the art would appreciate that such modifications belong within the scope of the present invention.

What is claimed is:

1. A reformer of a fuel cell system, the reformer comprising:
   a reformation reactor unit configured to reform fuel and generate reformed gas comprising hydrogen, the reformation reactor unit comprising a plurality of reactors, each of the reactors comprising a plate having a flow channel therein;
   a heat-insulating unit comprising an inner wall completely surrounding and in contact with the outermost surfaces of the plates, and an outer wall spaced from the inner wall to define a gap therebetween, the gap forming a vacuum area surrounding the reformation reactor unit configured to recover heat generated from the reformation reactor unit; and
   a connection member penetrating and connecting the inner wall and the outer wall and a supply line extending through the connection member to a reactor of the plurality of reactors,
   wherein the inner wall is comprised of ceramic.

2. The reformer of claim 1, wherein the plurality of reactors of the reformation reactor unit comprises:
   a first reactor for combusting the fuel and air through a catalytic oxidation reaction and generating the heat; and
   a second reactor for absorbing the heat generated from the first reactor, vaporizing mixed fuel of the fuel and water, and generating the reformed gas from the vaporized fuel through a catalytic reformation reaction.

3. The reformer of a fuel cell system of claim 1, wherein the outer wall comprises at least one material selected from ceramics, aluminum, and zirconium.

4. The reformer of claim 1, further comprising at least one carbon-monoxide reducing section connected to the reformation reactor unit for reducing a concentration of carbon monoxide from the reformed gas generated from the reformation reactor unit.

5. The reformer of claim 1, wherein the connection member is a spacer maintaining the gap between the inner wall and the outer wall.

6. The reformer of claim 1, wherein the outer wall of the heat-insulating unit has an inner surface coated with a reflective layer for reflecting the heat generated from the reformation reactor unit.

7. The reformer of claim 1, wherein the outer wall of the heat-insulating unit has a rough inner surface for reflecting the heat generated from the reformation reactor unit.

8. A reformer of a fuel cell system, the reformer comprising:
- a reformation reactor unit configured to reform fuel and generate reformed gas comprising hydrogen, the reformation reactor unit comprising a plurality of reactors, each of the reactors comprising a plate having a flow channel therein;
- a heat-insulating unit comprising an inner wall completely surrounding and in contact with the outermost surfaces of the plates, and an outer wall spaced from the inner wall to define a gap therebetween, the gap forming a vacuum area surrounding the reformation reactor unit configured to recover heat generated from the reformation reactor unit;
- a connection member penetrating and connecting the inner wall and the outer wall and a supply line extending through the connection member to a reactor of the plurality of reactors; and
- a heat-insulating member in the gap between the inner and outer walls, wherein the inner wall is comprised of ceramic.

9. The reformer of claim 8, wherein the heat-insulating member comprises glass fiber.

10. The reformer of claim 8, wherein the heat-insulating member comprises porous ceramics.

11. The reformer of claim 8, wherein the heat-insulating member surrounds the inner wall.

12. The reformer of claim 1, wherein the connection member comprises a spacer wall penetrating and extending between an outer surface of the outer wall and an inner surface of the inner wall, and the supply line comprises a supply line wall enclosed by the spacer wall between the outer surface of the outer wall and the inner surface of the inner wall.

* * * * *